United States Patent
Sander

(10) Patent No.: US 8,240,861 B2
(45) Date of Patent: Aug. 14, 2012

(54) ILLUMINATION DEVICE FOR A MICROSCOPE

(75) Inventor: Ulrich Sander, Rebstein (CH)

(73) Assignee: Leica Instruments (Singapore) Pte. Ltd., Singapore (SG)

(*) Notice: Subject to any disclaimer, the term of this patent is extended or adjusted under 35 U.S.C. 154(b) by 619 days.

(21) Appl. No.: 12/389,144

(22) Filed: Feb. 19, 2009

(65) Prior Publication Data

US 2009/0213617 A1 Aug. 27, 2009

(30) Foreign Application Priority Data

Feb. 28, 2008 (DE) .................... 10 2008 011 526

(51) Int. Cl.
*F21V 33/00* (2006.01)

(52) U.S. Cl. .......... 362/84; 359/385; 362/253; 313/637; 313/153; 313/234; 313/607

(58) Field of Classification Search .................. 362/84, 362/253, 234; 313/637, 153, 234, 607; 359/385–390, 368
See application file for complete search history.

(56) References Cited

U.S. PATENT DOCUMENTS

| 5,998,934 | A  | * | 12/1999 | Mimasu et al. | 315/118 |
| 6,737,809 | B2 | * | 5/2004  | Espiau et al. | 315/39  |
| 2002/0141176 | A1 | * | 10/2002 | Cekic et al. | 362/84 |
| 2003/0062852 | A1 | * | 4/2003  | Park et al. | 315/248 |
| 2003/0193299 | A1 | * | 10/2003 | Choi et al. | 315/248 |
| 2005/0062426 | A1 | * | 3/2005  | Hu | 315/39 |
| 2007/0139954 | A1 |   | 6/2007  | Sander |  |

FOREIGN PATENT DOCUMENTS

DE    10 2005 060 469    6/2007

\* cited by examiner

*Primary Examiner* — Laura Tso

(74) *Attorney, Agent, or Firm* — Nelson Mullins Riley & Scarborough, LLP

(57) ABSTRACT

An illumination device for a microscope, in particular for an operation microscope, has a light source with an improved lifetime. The light source is in the form of a gas discharge lamp having a microwave generator, a microwave waveguide and an electrodeless bulb. The bulb contains a luminescent material and is coupled to the microwave waveguide so that microwaves can stimulate the luminescent material to emit light.

20 Claims, 2 Drawing Sheets

ILLUMINATION DEVICE FOR A MICROSCOPE

The invention relates to an illumination device for a microscope, in particular an operation microscope.

BACKGROUND OF THE INVENTION

Modern conventional illumination devices for microscopes, in particular for operation microscopes, commonly use halogen lamps or gas discharge lamps, and in particular xenon lamps, as a light source to illuminate the microscope's object field.

Although halogen lamps are inexpensive, they have a limited lifetime (about 50 hours), and their luminosity decreases as their operating time increases because the bulb's filament material evaporates and deposits onto the bulb. Furthermore, the intensity maximum of a halogen lamp's spectrum may shift relative to daylight according to the lamp's color temperature, possibly leading to false color impressions.

Xenon lamps are therefore used in many applications in which very bright illumination is desirable, for example operation microscopes. Xenon lamps are gas discharge lamps in which a filler gas mixture containing xenon is made to luminesce in a bulb by a gas discharge. They are distinguished by a high luminous power with a large component in the visible spectral range. In the xenon lamps used to date, the gas discharge is induced by applying a high voltage to two electrodes arranged inside the bulb. Here again, however, the luminous power decreases over the operating time because the electrode material evaporates and deposits on the bulb, the lamp failing when the electrode material fully evaporates. Based on experience, conventional xenon lamps only have a lifetime of about 500 operating hours. In operation microscopes, it is therefore possible that a xenon lamp may fail unexpectedly during a long operation.

Various proposals have already been made in order to prevent the illumination device from failing unexpectedly. For example, operating counters used in illumination devices in which a xenon lamp is the light source count the lamp's hours of operation so that operating staff may change the lamp as a precautionary measure after a certain number of operating hours have elapsed. Furthermore, DE A 10 2005 060 469 discloses a lamp changer system that switches over from a primary lamp to an auxiliary lamp during operation. Suitable sensors monitor the lamp's power and automatically initiate a lamp change when appropriate.

These measures mitigate, but do not solve, the problem of limited lifetime. Furthermore, operating hour counters provide only an approximate indication of the performance capacity, so that a lamp may fail prematurely even where an operating hour counter is provided or, conversely, may have a usable remaining life despite the counter's warning. Moreover, the replacement of a xenon lamp or another discharge lamp, and/or the provision of an auxiliary light source together with a changer mechanism, are elaborate and expensive.

SUMMARY OF THE INVENTION

It is therefore an object of the invention to provide an illumination device for a microscope with a desired illumination lifetime.

This and other objects may be achieved by one or more embodiments described herein. In one embodiment of the present invention, an illumination device for a microscope, in particular for an operation microscope, comprises at least one light source in the form of a gas discharge lamp and illumination optics, by which light from the light source can be projected into the microscope's object field. The light source comprises a microwave generator and a microwave waveguide. A bulb contains a luminescent material and is coupled to the microwave waveguide so that the luminescent material can be stimulated to emit light by the microwaves without use of electrodes in the bulb. By injecting microwaves into the bulb, a gas discharge is initiated in the bulb, a plasma is generated, and visible and/or UV light is generated by atomic or molecular transitions and by recombination radiation. The input has the advantage of operating without electrodes, which can suffer wear or whose material can be deposited onto the bulb walls. In this way, a light source is provided which has a much longer lifetime and a more consistent luminous power throughout the lifetime.

The lifetime for a light source in this embodiment is, for example, in the range of 20,000 hours. This is 40 times that of previous systems and may allow several years of maintenance-free operation even with intensive use. Systems for monitoring the light source's functional capacity or for automatically replacing the light source may be considered unnecessary in certain circumstances but may also be provided as an additional protection against the light source's failure if desired.

The luminescent material is generally a gas fill, preferably consisting of a noble gas and a light emitter, for example a metal vapour. A fill containing xenon (xenon lamp) is preferred in one embodiment because of the resulting spectrum is similar to daylight. The bulb may also be coated for the purpose of modifying the emission characteristic. Since the bulb is exposed to a large thermal load, in one preferred embodiment it is constructed of quartz glass or ceramic.

The microwave waveguide in this embodiment is shaped in such a way that microwaves with a particular wavelength can resonate, so that a particularly large amount of microwave energy can be injected into the bulb, which is located in the microwave waveguide or an integral component of the waveguide. Since the wavelength is comparatively large in air or in a vacuum, and the bulb preferably has an extent of about one half wavelength, the space requirement for the light source may be large in this example.

A solid state-based electronic component or another microwave source, for example a klystron or magnetron, which generates microwaves with a frequency of 0.5-30 GHz, preferably 0.5-10 GHz, is used as the radiofrequency/microwave generator in one embodiment. The microwave generator is preferably thermally insulated from the bulb so as not to be damaged or even destroyed by the bulb, which may operate at a temperature of up to 1000° C.

In order to make the system even smaller and, for instance, make it usable in microscopy without sizeable design adaptions of known microscope stands, frames and/or illumination opticss, a microwave waveguide of an embodiment of a system as disclosed herein preferably contains a material with a high dielectric constant and a large heat resistance in the regions not forming the bulb, as described in U.S. published application 2002/0011802. The dielectric constant is preferably more than two, particularly preferably more than nine. Particular ceramics, for example aluminum oxides, zirconium oxides or titanium oxides, or silicone oil, may be used as the dielectric. The arrangement, dimensions and materials of the microwave waveguide and bulb, as well as the filler gas, may be as described in U.S. published application 2002/0011802. In particular, one of the operating modes mentioned therein ("resonant cavity mode," "dielectric oscillator mode") may be implemented. Overall, bulb sizes of only a few millimeters can be achieved with the aid of a dielectric in the waveguide, so that the light source can be configured compactly and installed, for example in slot-in-fashion, in a microscope structure instead of previously used gas discharge lamps.

The light source is preferably enclosed on all sides by screening, which is configured so that the microwaves cannot escape. This will prevent the microwaves from being able to interfere with sensitive electronic apparatus in the operating theater and exposing staff who are present. The screening is produced, for example, by an electrically conductive (for example correspondingly coated) housing. In the region of the exit window for the light being generated, there is preferably an optically transparent electrically conductive layer. In this regard, a lens forming the exit window may be coated in one preferred embodiment using an indium-tin oxide (ITO) layer, which is optically transparent. The screening may also be integrated in a static frame for the light source.

In another embodiment, the housing of the light source is preferably equipped with a heat exchange device for dissipating excess heat. This may involve passive cooling, for example by means of a surface enlarged by cooling fins, and/or active cooling by circulation of a coolant, in particular air. As an alternative or in addition, the light source may also be cooled by Peltier elements.

For the purpose of adapting the illumination to different desired spectral properties of the illumination light, or if wear of the bulb unexpectedly occurs, the bulb may be configured to be changeable, in particular removable from the waveguide, so that it can be replaced independently of the waveguide and the microwave generator. In contrast to replacing the entire light source, this entails substantially less technical and financial outlay.

In a further embodiment, the light source may have various bulbs preferably with different luminescent materials which can be coupled selectively to the microwave waveguide. To this end, an automatic changer system may be provided, which places a respective desired bulb at the position of greatest microwave incidence.

BRIEF DESCRIPTION OF THE DRAWINGS

A disclosure of the present invention is set forth in this specification, which makes reference to the accompanying drawings, in which.

Figure 1:
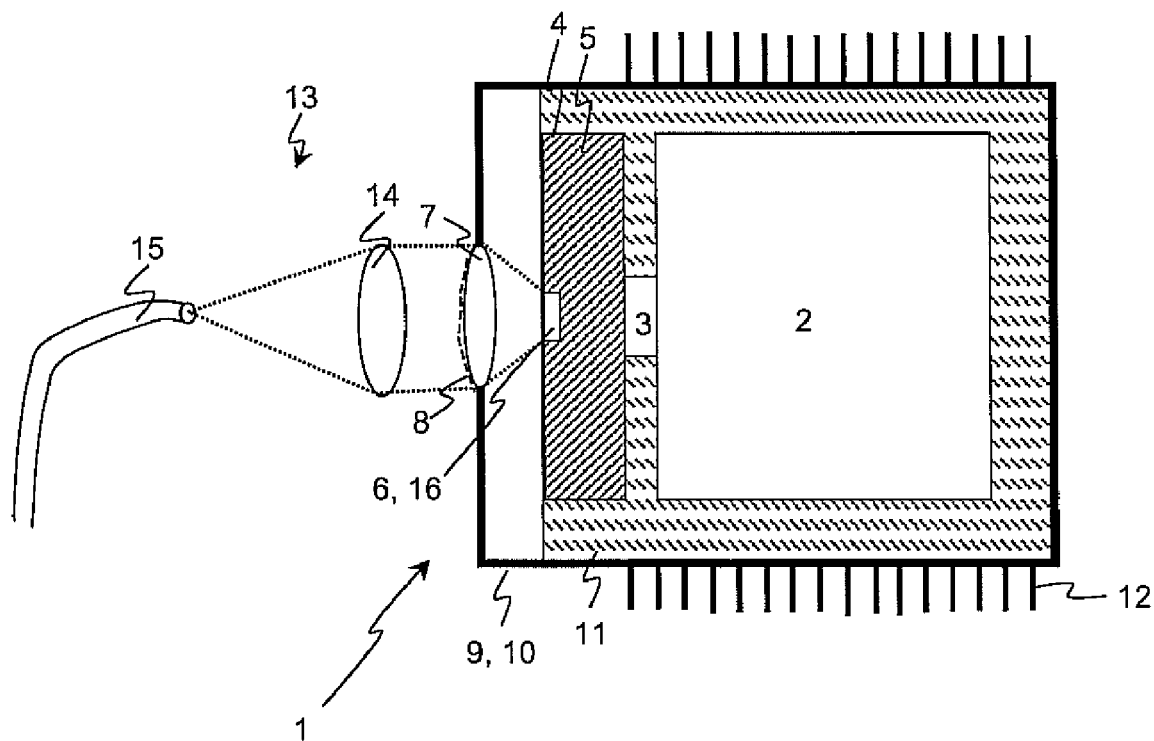
FIG. 1 is a schematic illustration of an illumination device in accordance with an embodiment of the present invention, having a light source in the form of an electrodeless gas discharge lamp.

Repeat use of reference characters in the present specification and drawings is intended to represent same or analogous features or elements of the invention.

DETAILED DESCRIPTION

Reference will be made in detail to certain embodiments of the invention, one or more examples of which are illustrated in the accompanying drawings.

Referring to FIG. 1, an illumination device for a microscope has a light source 1 and illumination optics 13. Some of the illumination optics 13, in this example a lens 7, may form a structural unit with the light source 1.

The light source 1 is a gas discharge lamp having a bulb 6, which contains a gaseous luminescent material in a gastightly sealed fashion. The bulb 6 is embedded in a waveguide 4 for microwaves and, for example, is arranged so that it lies at a position of greatest electric field strength when a resonance condition for the microwaves is satisfied in the waveguide. Microwave radiation is injected by a microwave generator 2, which is, for example, a semiconductor component on a printed circuit board, through a coupling piece 3 into the waveguide 4. Except for the bulb 6, waveguide 4 is filled with a dielectric 5 having a high dielectric constant so that the effective wavelength of the microwaves is reduced relative to a vacuum. The bulb 6 may be formed by a recess 16 in the dielectric 5, or it may be placed in such a recess 16.

In the vicinity of the bulb 6, the housing 9 has an exit window 7, which is transparent in the optical range and preferably substantially opaque for microwave radiation. It may, as in the presently described example, be configured as a lens and therefore functionally constitute a part of the illumination optics 13 directly.

When there is a sufficient field strength, the microwaves induce a gas discharge in the luminescent material. The radiation thus created in the visible range is output through exit window 7 and illumination optics 13, and is projected into the object region of the microscope.

To this end, for example, the illumination optics 13 contain a lens 14 or a lens system by which the light from the light source 1 is injected into an optical fiber 15. The light is thereby guided into or in front of the object region of a microscope, as shown if FIG. 3.

The microwave waveguide 4 and microwave generator 2 are arranged in a housing 9. If they do not adjoin the housing wall directly, a thermally conductive material 11 is arranged, in the example illustrated in FIG. 1, between these components and the housing wall to facilitate heat dissipation. The heat exchange with the environment is further enhanced in this embodiment by cooling fins 12 on the outer surface of the housing.

Housing 9 is preferably electrically conductive, for example by means of a suitable coating, and therefore serves as screening 10 for microwaves. Likewise for the purpose of screening, the exit window 7 has an electrically conductive, optically transparent coating. This may furthermore serve as a thermal protection filter. As an alternative, perforated metal plates, which have previously been used only as a brightness regulator, may also be configured as RF (radio frequency) filters owing to their conductive properties.

The electrical power supply, and a control device which may sometimes be provided, for the microwave generator are not represented. Filters and/or beam shaping or beam blocking elements may also be arranged in the beam path inside or outside the light source 1. A sensor, which may be provided for measuring the intensity of the visible light being generated, may be optionally coupled to the microwave generator or its controller to form a control loop, in order to generate a constant or adjustably variable light intensity.

Figure 2:
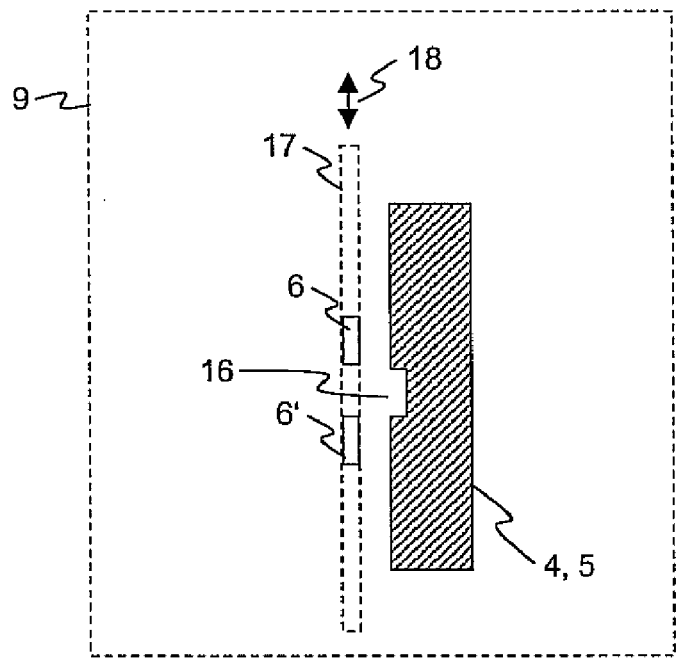
FIG. 2 is a schematic illustration of a waveguide as in FIG. 1, with a changeable bulb.

FIG. 2 schematically shows that the bulb 6 may be removable from the waveguide 4 or the dielectric 5. This facilitates the repair process, if necessary, since the bulb may be removed and replaced without replacement of the remainder of the electronics.

Still referring to FIG. 2, bulb 6 may selectively be used alternately with one or more further bulbs 6'. The bulbs contain, for example, different luminescent material fills with which light of a different spectral composition is generated, for example monochromatic light with a different color temperature. For fluorescence spectroscopy/microscopy, for example, it may be beneficial to generate a discrete line spectrum with one bulb of the discharge lamp in order to stimulate particular dyes selectively, and to generate white light with another bulb. The invention allows simple switching between these various types of illumination.

To this end, for example, the bulbs 6, 6' may be arranged on a support 17, which is arranged or displaceable relative to the waveguide 4 so that one of the bulbs 6, 6' can be positioned selectively at the position of greatest field strength by changer device 18. These elements are arranged inside the housing 9 and can preferably be driven so that the housing does not need to be opened in order to change the bulb.

In contrast to known illumination devices in which it is possible to select between two alternative light source, the embodiment described with respect to FIG. 2 does not require optics to combine two alternative beam paths. Because the bulb, and therefore the site of light generation, always lie at the same position in the illumination device, the illumination optics do not need to be adjusted when a bulb is changed (in contrast to the lamp change previously carried out).

Figure 3:
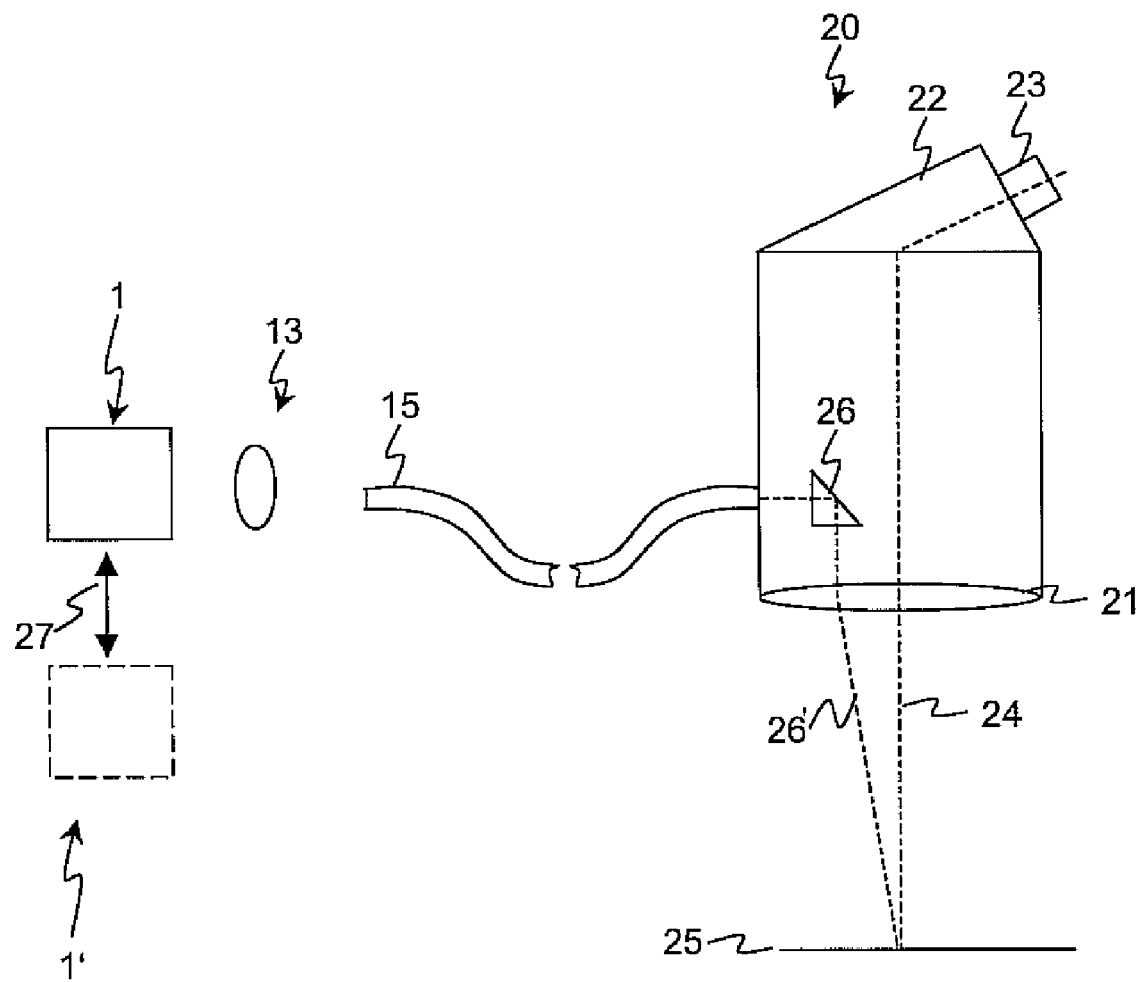
FIG. 3 is a schematic illustration of a microscope according to an embodiment of the present invention.

FIG. 3 shows the installation of an illumination device in a microscope 20, for example in a stereo operation microscope. Light coming from the light source 1 is injected into an optical fiber 15 that terminates in the microscope body on the fiber's output side. Illumination optics 13 are symbolized by an optical fiber 15 and a lens. The microscope 20 is represented above an object plane 25, from which images are delivered along the observation beam path 24 through a primary objective 21, a tube 22 and eyepieces 23 to an observer. The observation beam path which leaves the output end of optical fiber 15 is deviated by means of a deviating prism 26 or another deviating element to form a beam path 26' that is essentially coaxial with the optical axis of objective 21 and is focused onto the object plane 25 through the primary objective 21. The illumination may also be produced as oblique illumination with an illumination beam path extending beside the objective 21, obliquely with respect to the objective's axis 24.

In another embodiment, the light source 1 may also be changeable as a whole, as indicated in FIG. 3, by an alternative light source 1'. Light from source 1' can be injected into optical fiber 15 as an alternative to the light of the first light source 1. Alternative light source 1' may be constructed similarly to first light source 1, or it may have a different design, for example a halogen lamp. The light sources 1, 1' are displaced or replaced by means of a changer device 27. The light sources 1, 1' are preferably changed as described in DE A 10 2005 060 469 and U.S. published application 2007/0139954 (Ser. No. 11/611,419, titled "Apparatus for Illuminating a Viewing Field, for Example an Object Field Under a Microscope"), the entire disclosure of which is incorporated by reference herein. Corresponding components (for example sensors, controller, changer system) may also be provided in this illumination device with the arrangement and functionality described in DE 10 2005 060 469 and U.S. 2007/0139954.

Instead of arranging the light source 1 at a distance from the working region of the microscope and injecting the light into the microscope through optical fiber 15, the light source 1 may also be arranged in the immediate vicinity of the microscope, or it may be an integral component of the microscope. It may be arranged, for example, in the vicinity of the objective, the light being directed onto the object by a lens and deviating elements.

While one or more embodiments of the present invention have been described above, it should be understood that any and all equivalent realizations of the present invention are included within the scope and spirit thereof. Thus, the embodiments presented herein are provided by way of example only.

What is claimed is:

1. An illumination device, comprising:
   a bulb containing a luminescent material;
   a microwave generator;
   a microwave waveguide coupled between the bulb and the microwave generator so that radiation from the microwave generator received by the microwave waveguide and directed to the bulb stimulates the luminescent material to generate light without use of electrodes in the bulb; and
   optics that receive the light from the bulb and direct the light to an output,
   wherein the microwave waveguide comprises a material with a high dielectric constant.

2. The illumination device according to claim 1, wherein the material has a dielectric constant greater than two.

3. The illumination device according to claim 1, comprising a microwave radiation screen that at least partially encloses the bulb, the microwave generator and the microwave waveguide.

4. The illumination device according to claim 1, comprising a housing that at least partially encloses the bulb, the microwave generator and the microwave waveguide and that defines an exit window for the light.

5. The illumination device according to claim 4, wherein the exit window is opaque for microwaves.

6. The illumination device according to claim 4, wherein the exit window has an optically transparent, electrically conductive coating comprising a metal vapor layer.

7. The illumination device according to claim 6, wherein the metal vapor layer comprises an indium-tin oxide layer.

8. The illumination device according to claim 4, wherein the exit window is formed by a lens.

9. The illumination device according to claim 1, wherein the bulb and the microwave waveguide are separable from one another.

10. The illumination device according to claim 9, comprising a plurality of said bulbs, one of said plurality of bulbs being selectively coupled to the microwave waveguide during operation of the illumination device.

11. The illumination device according to claim 10, wherein each said bulb contains a respective different luminescent material.

12. The illumination device according to claim 1, comprising a housing having a heat exchange device for dissipating excess heat.

13. A microscope, comprising:
   a gas discharge lamp; and
   optics that receive light from the lamp and direct the light to an object plane,
   wherein the gas discharge lamp comprises
      a bulb containing a luminescent material,
      a microwave generator, and
      a microwave waveguide coupled between the bulb and the microwave generator so that radiation from the microwave generator received by the microwave waveguide and directed to the bulb stimulates the luminescent material to generate the light without use of electrodes in the bulb,
   wherein the microwave waveguide comprises a material with a high dielectric constant.

14. The microscope according to claim 13, wherein the material has a dielectric constant greater than two.

15. The microscope according to claim 13, comprising a housing that at least partially encloses the bulb, the microwave generator and the microwave waveguide and that defines an exit window for the light between the bulb and the optics, wherein the housing and the exit window are opaque to microwaves.

16. The microscope according to claim 15, wherein the exit window has an optically transparent, electrically conductive coating comprising a metal vapor layer.

17. The microscope according to claim 15, wherein the exit window is formed as a lens.

18. The microscope according to claim 13, wherein the bulb and the microwave waveguide are separable from each other.

19. The microscope according to claim 18, comprising a plurality of said bulbs, one of said plurality of bulbs being selectively coupled to the microwave waveguide during operation of the microscope, wherein each said bulb contains a respective different luminescent material.

20. A method of operating a microscope, comprising the steps of:
providing a gas discharge lamp for a microscope having optics that receive light from the lamp and direct the light to an object plane, wherein the gas discharge lamp comprises a bulb that contains a luminescent material and a microwave waveguide comprising a material with a high dielectric constant;
generating microwave radiation external to the bulb;
guiding the microwave radiation to the bulb via the microwave waveguide so that the radiation stimulates the luminescent material to generate the light without use of electrodes in the bulb.

* * * * *

UNITED STATES PATENT AND TRADEMARK OFFICE
CERTIFICATE OF CORRECTION

| | | |
|---|---|---|
| PATENT NO. | : 8,240,861 B2 | Page 1 of 1 |
| APPLICATION NO. | : 12/389144 | |
| DATED | : August 14, 2012 | |
| INVENTOR(S) | : Dr. Ulrich Sander | |

It is certified that error appears in the above-identified patent and that said Letters Patent is hereby corrected as shown below:

On the Title page of the patent, in the Inventor section, please add --Dr.-- prior to the Inventor's name.

In the specification, column 2, line 52, please remove the word "adaptions" and replace with the word --adaptations--.

In the specification, column 2, line 54, please replace the word "opticss" with the word --optics--.

In the specification, column 2, line 67, please remove the word "implented" and replace with the word --implemented--.

Signed and Sealed this
Eighth Day of January, 2013

David J. Kappos
*Director of the United States Patent and Trademark Office*